F. A. HAPTONSTALL.
COMBINED BONDING AND LOCKING DEVICE.
APPLICATION FILED APR. 12, 1916.
1,220,983.
Patented Mar. 27, 1917.
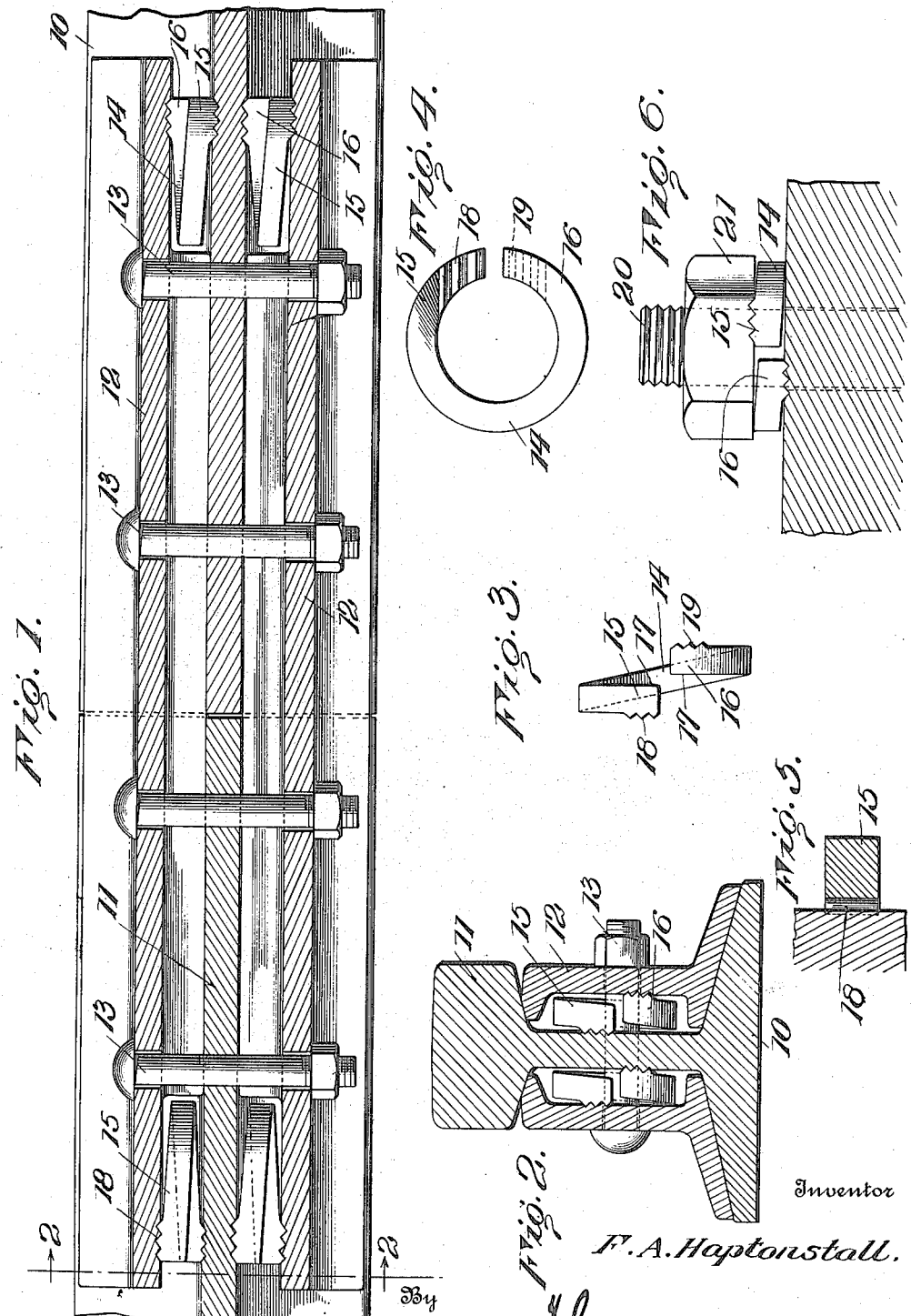

UNITED STATES PATENT OFFICE.

FRANKLIN A. HAPTONSTALL, OF HUNTINGTON, WEST VIRGINIA.

COMBINED BONDING AND LOCKING DEVICE.

1,220,983.      Specification of Letters Patent.      Patented Mar. 27, 1917.

Application filed April 12, 1916. Serial No. 90,679.

*To all whom it may concern:*

Be it known that I, FRANKLIN A. HAPTONSTALL, a citizen of the United States, residing at Huntington, in the county of Cabell and State of West Virginia, have invented certain new and useful Improvements in Combined Bonding and Locking Devices, of which the following is a specification.

This invention contemplates a combined bonding and locking member and has as its primary object to provide an improved device of this character which may be inserted between the angle bars and the meeting ends of coacting rails, at the joint therebetween, to provide an electrical bond between the said rails and which will also provide a locking means for the bolts connecting the said angle bars with the rails.

The invention has as a further object to provide a device of this character which will dispense with the use of bonding wires between the meeting ends of the rails and wherein electrical connection will be established between the rails directly through the angle bars so that should one of the rails or angle bars become broken, a track circuit therethrough would also be broken.

The invention has as a further object to provide an arrangement wherein the bonding and locking member will be housed by the angle bars and wherein the said member will yieldably engage the angle bars and the rails to establish an efficient electrical connection therebetween.

And a still further object of the invention is to provide an improved device of this character which may be used in connection with a bolt to lock the nut thereof and wherein the said member will be so formed as to cant the nut when the nut is turned into engagement with the said member with the member engaging the nut and the work for securely holding the nut fixed upon the bolt.

Other and incidental objects will appear as the description proceeds and in the drawings wherein I have illustrated the preferred embodiment of the invention and wherein similar reference characters designate corresponding parts throughout the several views, Figure 1 is a longitudinal sectional view illustrating a rail joint with a plurality of my improved bonding and locking members interposed between the angle bars of the joint and the meeting ends of the rails, Fig. 2 is a transverse sectional view more particularly showing the disposition of the locking members, Fig. 3 is a detail view showing the device detached and particularly illustrating the formation and disposition of the coacting reversely presented jaws of the device, Fig. 4 is a side view of the device more particularly showing the width of the locking member as well as the arrangement of the teeth upon the jaws, Fig. 5 is a fragmentary sectional view illustrating the manner in which the teeth of the locking member are adapted to engage the work, and Fig. 6 is an elevation showing the manner in which my improved device may be used upon a bolt to lock the nut thereon.

In order that the operation of my improved locking and bonding member may be entirely clear, I have, in the drawings, illustrated the device in connection with a joint between the meeting ends of rails 10 and 11. Overlying the joint between the rails are coacting angle bars 12 which are connected by a plurality of bolts 13.

Coming now more particularly to the subject of the present invention, I employ a helical locking and bonding member 14, as particularly illustrated in detail in Fig. 3 of the drawings. This bonding member is in the nature of a split ring, the terminals of which provide coacting jaws 15 and 16. The jaws 15 and 16 are directed laterally in opposite directions relative to the plane of the body portion of the ring and normally occupy a position with the inner faces 17 thereof arranged substantially parallel. Upon its outer side, the jaw 15 is thickened to provide a plurality of teeth 18 all of which touch a common plane. The jaw 16 is also thickened at its free extremity in a manner similar to the jaw 15 to provide, upon the outer side thereof, a plurality of teeth 19 at the outer end of the jaw. The teeth 19 also touch a common plane in a manner similar to the teeth 18 of the jaw 15 and it will be noted that normally, the planes of the teeth 18 and 19 are substantially parallel and intersect the axis of the ring at substantially right angles.

The jaws 15 and 16 are thus each thickened at their free ends and in this connection, attention is directed to the fact that the jaws are reversely presented and are each thickened from opposite sides thereof. The purpose of this construction will presently appear. Attention is further directed to the fact that the faces 17 of the jaws are smooth and unobstructed so that when the ring is contracted, the said faces will slide one upon the other to permit a corresponding relatively longitudinal movement of the jaws 15 and 16.

The ring of my improved bonding member is preferably formed of suitable metal having a high degree of resiliency and the body of the ring is relatively wide as particularly illustrated in Fig. 4 to thus enhance the resilient action of the ring to normally urge the jaws 15 and 16 in opposite directions. Preferably, the teeth 18 and 19 of the said jaws extend transversely thereof throughout their entire width, as also shown in detail in Fig. 4, and are arranged tangential to a point located axially of the ring, the teeth of each jaw being disposed in parallel series.

A pair of bonding members thus formed is disposed between corresponding extremities of the angle bars 12 and the web of the rail 10, while a similar pair is disposed between corresponding opposite extremities of the said angle bars and the web of the rail 11 as more particularly shown in Figs. 1 and 2 of the drawings. However, it will be understood that any suitable number of bonding members may be employed as may be found desirable and when so fitted in position and the bolts 13 are tightened to clamp the angle bars against the rails, the jaws 15 and 16 will be compressed in opposite directions against the yieldable tension of the said members with the teeth of one jaw of each member engaging flatly against one of the fish plates and with the teeth of the other jaw thereof engaging flatly against the web of one of the rails.

Particular attention is now directed to the fact that the teeth of the locking members engage, as shown in detail in Fig. 5, throughout their entire length with the work and are embedded therein to establish efficient electrical connection between the angle bars and the rails. Consequently, the use of bonding wires such as are now commonly employed, is eliminated and the expense and labor incident to the boring of holes in the rail webs to receive the said wires as well as the expense of the wires themselves is eliminated. Moreover, by the use of my improved bonding members, the angle bars 12 will be included in a track circuit passing through the rails 10 and 11. Accordingly should either of the rails become broken or should one of the angle bars become impaired, the circuit therethrough would be interrupted which would automatically cause the setting of the proper danger signal. Many serious accidents which now occur where bond wires are employed at the joints between the rails may thus be avoided by the use of my improved bonding member since it often happens that the angle bars at one of the joints become broken at a point intermediate the length of the bond wires or one of the rails becomes broken without interrupting the circuit through the bond wires so that even though the track were unsafe no danger signal would be set. It will be seen that I provide an arrangement which effectually overcomes the likelihood of any such contingency. Since the jaws of the bonding members are yieldably held by the resilient action of the said members in engagement with the rails webs and the angle bars, the vibration incident to the passing of rolling stock over the rails will cause the teeth of the said jaws to wear against the rails and angle bars to at all times maintain the points of contact between the bonding members, the rails, and the angle bars bright and clean, so that an electrical current may readily pass therebetween and the efficiency of the track circuit thus insured.

The bonding members when arranged between the rails and the angle bars will act to urge the angle bars outwardly in opposite directions to clamp the nuts of the bolts 13 upon the said bolts. Consequently, I provide a device which not only forms a bonding member between the rails and the angle bars, but also constitutes a locking member for the fastening devices at the rail joint. In this connection attention is directed to the fact that the bonding members may be inserted at the ends of the angle bars in the space between the said angle bars and the webs of the rails without the necessity of removing the angle bars. Consequently, existing railway track may, without structural change, be readily equipped with my improved device.

In Fig. 6 of the drawings, I have shown my improved bonding and locking member applied directly to a bolt 20 for locking the nut 21 of the bolt thereon. The locking member is arranged to surround the bolt and is interposed between the nut and the work. It will be seen that as the nut is turned toward the work, the jaws 15 and 16 of the said locking member will be compressed against the yieldable action thereof to occupy a position illustrated with the teeth of the said jaws embedded in the nut and the work. The jaws being thickened at their ends from opposite sides thereof, are adapted to cant the nut upon the bolt for securely binding the nut in position, the purpose of the particular arrangement of the thickened portions of the jaws now being apparent. It will therefore be seen that the device may be readily employed not only as a bonding member but as a locking member or nut lock and may be used in connection with a conventional type of bolt. Furthermore, it will now be noted that should it be desired to mount the bonding members shown in Fig. 1 upon the bolts 13, this arrangement may be adopted and would prove advantageous in the track systems of electric railways using a high voltage.

Having thus described my invention, what I claim and desire to secure by Letters Patent is:

1. A bonding member including a split annular body portion having its extremities deflected laterally in opposite directions from the plane of the body of the said member and providing terminal jaws thickened to form a series of teeth in the outer edges thereof with the series of teeth of each jaw touching a common plane normally intersecting the axis of the said member at substantially right angles with the planes of the said series of teeth disposed substantially parallel.

2. A combined bonding and locking member including a split annular body portion provided with smooth and unobstructed side faces and thickened at its extremities in opposite directions to form jaws each provided with a series of transversely extending teeth touching a common plane normally intersecting the axis of the said member at substantially right angles with the planes of the said series of teeth disposed substantially parallel, the jaws being offset with respect to each other a distance greater than the thickness of either of the jaws.

In testimony whereof I affix my signature.

FRANKLIN A. HAPTONSTALL. [L. S.]